United States Patent Office 3,446,845
Patented May 27, 1969

3,446,845
α,α-DI-(FLUOROALKYL)BENZYLAMINES AND THEIR PREPARATION FROM AROMATIC COMPOUNDS AND FLUOROALKYLIDENE-IMINES
David M. Gale, Wilmington, Del., assignor to E. I. du Pont de Nemours and Company, Wilmington, Del., a corporation of Delaware
No Drawing. Continuation-in-part of application Ser. No. 455,968, May 14, 1965. This application Dec. 30, 1965, Ser. No. 517,830
Int. Cl. C07c 87/28, 85/00, 149/32
U.S. Cl. 260—570.8                                7 Claims

ABSTRACT OF THE DISCLOSURE

α,α-Di(fluoroalkyl)benzylamines, e.g., 4,4′-oxybis[α,α-bis(trifluoromethyl)benzylamine], and their preparation from aromatic compounds and fluoroalkylideneimines, e.g., diphenyl ether and hexafluoroisoproylideneimine. The compounds are useful as precursors of polyamides.

Related application

This application is a continuation-in-part of my copending application Ser. No. 445,968, filed May 14, 1965, and now abandoned.

Description of the invention

This invention relates to α,α-di(fluoroalkyl)benzylamines and to their preparation.

The new compositions of this invention are the class of benzylamines having the formula

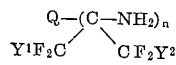

wherein $Y^1$ is fluorine, chlorine or a 1-6 carbon perfluoroalkyl, ω-chloroperfluoroalkyl or ω-hydroperfluoroalkyl radical and $Y^2$ is defined as $R^1$ or is hydrogen with the proviso that, when $Y^2$ is hydrogen, $Y^1$ is fluorine or 1-6 perfluoroalkyl; $n$ is an integer from 1-2; and Q is the radical formed by removal of $n$ hydrogen atoms from a compound HQH selected from the group consisting of monocyclic, polycyclic, and fused polycyclic compounds containing 1-3 six-membered carbocyclic aromatic rings, and polycyclic compounds containing two six-membered carbocyclic aromatic rings which are joined through a bridge selected from the group consisting of —O—, —S—,

and $(CH_2)_m$, where R is selected from the group consisting of hydrogen, phenyl and alkyl of 1-6 carbon atoms, and $m$ is an integer from 1-6; with the proviso that each said carbocyclic aromatic ring contains 0-4 substituents selected from the group consisting of alkyl, perfluoroalkyl, hydroxy, alkoxy, phenoxy, alkylthio, amino, monoalkylamino, dialkylamino, cyclopentyl, cyclohexyl, halo and nitro, with each of said alkyl and alkoxy moieties containing 1-6 carbon atoms.

The compounds of this invention are prepared by reacting, in the presence of a Friedel-Crafts catalyst, a compound HQH with a polyfluoroalkylideneimine of the general formula $Y^1CF_2$—C(=NH)$CF_2Y^2$. The symbols Q, $Y^1$, and $Y^2$ have the same definitions as provided above.

The imines employed herein as reactants are obtained by reacting a polyfluoroketone with at least one molar equivalent of ammonia at −50° to 10° C., followed by dehydration of the resulting aminohydroxy polyfluoroalkane with a dehydrating agent in the presence of an acid acceptor, and then distilling to recover the imine. The imine reactant also may be prepared by reacting hydrazoic acid with a polyfluorothioketone. Both of the aforesaid preparatory methods for the polyfluoroalkylideneimine are disclosed and claimed in U.S. Pat. 3,226,439.

The second reactant in the preparatory process of the present invention is an aromatic compound HQH which contains at least one aromatic ring capable of entering into Friedel-Crafts condensation reactions with alkyl halides in the presence of aluminum chloride. More particularly, in the compound HQH, Q is the radical remaining after removal of one or two hydrogen atoms therefrom and may be an aryl or arylene radical of one to three six-membered carbocyclic aromatic rings, thus providing a total of six to eighteen carbon atoms in the aromatic system, or Q may be an atom-interrupted aryl or arylene radical in which two six-membered carbocyclic aromatic rings are separated by a divalent group X, the latter being —O—, —S—,

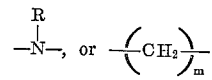

wherein R is hydrogen, phenyl or alkyl of 1 to 6 carbon atoms and $m$ is 1 to 6. Moreover, each carbocyclic ring in the radical Q may, but need not, have substituents in addition to those already described above. Thus, each carbocyclic ring may contain 1 to 4 substituents selected from the group consisting of alkyl, perfluoroalkyl, hydroxy, alkoxy, phenoxy, alkythio, amino, monoalkylamino, dialkylamino, cyclopentyl, cyclohexyl, halo and nitro, with each of said alkyl and alkoxy moieties containing 1 to 6 carbon atoms. Examples of HQH compounds useful for preparing the benzylamines of this invention are benzene, naphthalene, anthracene, phenanthrene, toluene, the xylenes, ethyl-, propyl-, butyl-, or n-hexylbenzene, methyl naphthalene, cyclohexylbenzene, 1-methyl-3-butylbenzene, diphenyl, dibenzyl, the mono-, di- or tetrafluorobenzenes, benzotrifluoride, monochlorobenzene, 1-methyl - 3 - bromobenzene, ortho-dichlorobenzene, phenol, 1-hydroxy-4-hexylbenzene, 1,4-dihydroxybenzene, methoxybenzene, butoxybenzene, 1-methyl-4-ethoxybenzene, 1,3,5-trimethylbenzene, aniline, α-naphthylamine, N-butylaniline, N,N-dimethylaniline, N,N-diethyltoluidine, 4-nitrodiphenyl, diphenyl ether, methyl naphthyl ether, diphenylamine, triphenylamine, N-ethyldihpenylamine, diphenyl thioether, methyl phenyl thioether, and the like.

The aromatic compound employed must contain at least one ring capable of reacting with the fluoroalkylideneimine. As indicated above, this reactivity is readily determined by testing whether or not the aromatic compound undergoes the convention Friedel-Crafts condensation reaction with an alkyl halide in the presence of aluminum chloride. Whether or not the reaction can lead to a product containing 1 to 2 aminodi(fluoroalkyl)methyl groups is determined primarily by the presence or absence on the aromatic ring or rings of substituents which either activate or inhibit the Friedel-Crafts reaction, and secondarily, by the mole ratio of alkylideneimine to HQH compound charged to the reactor. The two reactants can be used in any desired molar ratio, but usually between 0.25 and 5 moles of imine per mole of aromatic reactant. When the mole ratio of imine to HQH is 1:1 or less, the principal product is a monoamine. When the ratio of imine to HQH is at least 2:1 on a molar basis, then substantial amounts of the diamine generally are formed.

In general, the reaction between the HQH compound and the alkylideneimine is carried out in the presence of a Friedel-Crafts catalyst, such as aluminum chloride, aluminum bromide, boron trichloride, boron trifluoride, antimony pentachloride, zinc chloride, ferric chloride, hydrogen fluoride, stannic chloride, and the like.

The amount of catalyst used can be as low as 0.005% by weight of the imine. However, amounts up to the molar equivalent of the imine can be used and in cases where the product has a high tendency to complex with the Friedel-Crafts catalyst, the use of such amounts constitutes the preferred practice.

The reaction between the HQH compound and alkylideneimine can be effected in the presence or absence of an organic liquid reaction medium which is unreactive with the reactants and reaction product under the conditions of reaction. Suitable media are the normally liquid aliphatic and cycloaliphatic hydrocarbons, such as the hexanes, heptanes, octanes, cyclohexanes, methylcyclohexane, and other inert solvents, such as tetrachloroethane, tetrachloroethylene, carbon disulfide, and the like. Usually, however, the HQH compound is employed in amounts such that it functions both as a reactant and reaction medium.

The temperature at which the reaction between the HQH compound and alkylideneimine is conducted depends upon such variables as the reactivity of the HQH compound and the nature of the Friedel-Crafts catalyst used. With very active HQH compounds and catalysts, reaction can take place at temperatures as low as 0° C. The upper temperature is determined solely by the stability of the reactants and the reaction product. Most generally, the reaction is carried out at temperatures in the range of 50 to 300° C., preferably in the range of 100 to 275° C. Conveniently, the reaction is conducted in sealed reactors under autogenous pressure. This, however, is not a necessary condition and other types of reactors can be used.

The examples which follow are provided to illustrate but not limit the present invention. The reactor lining referred to in the examples as "Hastelloy" is a nickel-iron-molybdenum alloy. Representative polyfluoroalkylideneimines used as starting materials in the process of this invention are prepared as described in the following examples A, B, C and D.

EXAMPLE A

Pyridine (500 ml.) contained in a 1-liter flask fitted with a condenser cooled with solid carbon dioxide, a mechanical stirrer, thermometer and a gas inlet tube, was cooled to −25° C. by means of a solid carbon dioxide-acetone bath. The stirrer was started, and 200 g. (1.2 moles) of hexafluoroacetone was distilled into the flask, keeping the temperature between −25° and −30° C. Ammonia, 25 ml. at −78° C. (ca. 20.4 g., 1.2 moles), was then distilled into the stirred reaction mixture, keeping the temperature between −25° and −30° C. The cooling bath was replaced with a heating mantle, and the reaction mixture was warmed to 25° C. the condenser was replaced with a water-cooled condenser connected to a trap cooled with solid carbon dioxide, and 100 ml. (184 g., 1.2 moles) of phosphorus oxychloride was added dropwise at such a rate that gentle reflux was maintained. The gas that escaped through the condenser was collected in the cold trap. After the addition was completed (ca. 30 min.), the reaction mixture was heated to 100° C. and held there for 30 minutes. The condensate in the trap was distilled through a 40 cm.-packed column to give 138 g. (70% yield) of hexafluoroisopropylideneimine as a colorless liquid, B.P. 16–16.5° C., M.P. −47° C., $d_4^0$ 1.51; IR 5.98$\mu$ for C=N. The $F^{19}$ NMR spectrum showed two quartets centered at +5.77 and +7.62 p.p.m. ($J_{FF}$=6 c.p.s.) of equal area, with the lower field quartet further split to a doublet ($J_{FH}$=2.5 c.p.s.). The proton NMR spectrum showed a single broad band at 11.8 p.p.m.

Analysis.—Calcd. for $C_3HF_6N$: C, 21.83; H, 0.61; F, 69.07; N, 8.46. Found: C, 21.81; H, 0.76; F, 68.81; N, 8.16.

EXAMPLE B

A solution of 171 g. (100 ml. at −78° C., 0.937 mole) of chloropentafluoroacetone in 500 ml. of pyridine was cooled to −30° C. and 20 ml. (about 0.94 mole) of ammonia at −78° C. was slowly distilled thereinto. The mixture was then allowed to warm to room temperature and 100 ml. of phosphorus oxychloride was added dropwise over a period of 30 minutes. An exothermic reaction ensued and the temperature of the reaction mixture rose to 90° C., as refluxing began. The lower boiling material was removed from the reaction mixture by distillation, and the fraction that boiled below 100° C. was redistilled through a spinning band column. There was obtained 102 g. (60%) of chloropentafluoroisopropylideneimine as a colorless liquid, B.P. 46–47° C. (mostly 46.7°), $n_D^{25}$ 1.3130. The infrared spectrum contained a band at 5.92$\mu$ for C=N. The $F^{19}$ NMR spectrum showed evidence of two isomeric forms of this imine. The predominant isomer showed a quartet ($J_{FF}$=7 c.p.s.) for $CF_2$ at −4.34 p.p.m. further split to a doublet ($J_{FH}$=2 c.p.s.), and a higher field triplet ($J_{FF}$=7 c.p.s.) for $CF_3$ at +2.83 p.p.m. further split to a doublet ($J_{FH}$=2.3 c.p.s.). The isomer present in lesser amount showed a quadruplet ($J_{FF}$=7 c.p.s.) for $CF_2$ further split to a doublet (J=1.8 c.p.s.) at −2.08 p.p.m. and a triplet ($J_{FF}$=7 c.p.s.) for $CF_3$ at +5.05 p.p.m. The proton NMR showed a broad singlet centered at +11.6 p.p.m.

Analysis.—Calcd. for $C_3HClF_5N$: C, 19.86; H, 0.56; Cl, 19.55; F, 52.34; N, 7.77. Found: C, 20.24; H, 0.75; Cl, 19.64; F, 51.95; N 7.65.

EXAMPLE C

A mixture of 100 ml. of dry pyridine and 75 g. (0.28 mole) of decafluorodiethyl ketone (40 ml. at −78° C.) was kept below −25° C. and stirred while 6 ml. of ammonia was added. The mixture was then warmed to room temperature, and 24 ml. of phosphorus oxychloride was added dropwise at a rate sufficient to maintain gentle reflux. Volatile material was distilled into an ice-methanol trap (pot to 100° C.) and redistilled giving 9.4 g. (13%) of starting ketone and 271 g. (42% yield) of decafluoro-3-pentylideneimine, B.P. 52° C., $n_D^{25}$ 1.3227. IR showed an =NH band at 3.04$\mu$ and a C=N band at 5.99$\mu$. The proton NMR exhibited a single peak at +12.2 p.p.m. and the $F^{19}$ NMR showed multiplets at +14.9 (area 3), +15.6 (area 3), +48.6 (area 2) and +51.9 (area 2) p.p.m. (internal $FCCl_3$ reference).

Analysis.—Calcd. for $C_5HF_{10}N$: C, 22.65; H, 0.38; F, 71.41; N, 5.29; M.W. 265. Found: C, 23.06; H, 0.64; F, 71.65; N, 5.50; M.W. 265 (mass spec.).

EXAMPLE D

Pentafluoroisopropylideneimine is prepared according to the following sequence of reactions:

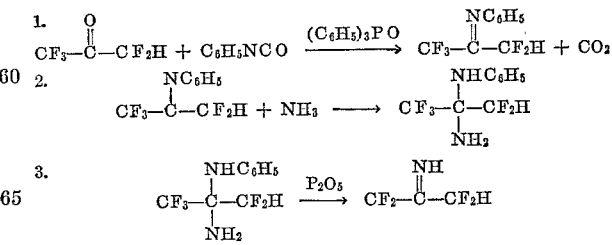

Preparation of N-phenylpentafluoroisopropylideneimine

A mixture of 71.4 g. (0.6 mole) of phenylisocyanate, 92 g. (0.62 mole) of pentafluoroacetone and 10 g. of triphenylphosphine oxide was heated at 200° C. for 16 hours in a 400-ml. bomb. The bomb was cooled and vented, and the contents were distilled to give 75.6 g. (56% yield) of N-phenylpentafluoroisopropylideneimine as a light yellow oil, B.P. 59.6–60° C. (10 mm.), $n_D^{25}$ 1.4394. The $F^{19}$ NMR (internal $FCCl_3$ reference) spectrum indicated a mixture of two isomers (syn and anti). The major isomer (82%) showed a triplet ($J_{FF}=7$) to doublet ($J_{FH}=1.3$) at 69.3 p.p.m. and a doublet ($J_{FH}=52$) to quartet ($J_{FF}=7$) centered at 120.4 p.p.m. The minor isomer (18%) showed a triplet ($J_{FF}=7$) to doublet ($J=1.3$) at 62.1 p.p.m. and a doublet ($J_{FH}=52$) to a quartet ($J=1.3$) at 125.4 p.p.m. The $H^1$ NMR spectrum of the major isomer showed a multiplet (5H) centered at $\tau 3.00$ and a triplet ($J=52$) to a quartet ($J=1.3$) centered at $\tau 3.96$ (1H); and the minor isomer showed a multiplet at $\tau 7.0$ (5H) and a triplet ($J=52$) centered at $\tau 3.84$ (1H). The ultraviolet spectrum showed $$\lambda_{max.}^{C_6H_{12}} \ 327 \ m\mu \ (\epsilon=15{,}500)$$

The infrared spectrum had an absorption at $5.88\mu$ for C=N.

*Analysis.*—Calcd. for $C_9H_6F_5N$: C, 48.44; H, 2.71; F, 42.57; N, 6.28. Found: C, 48.77; H, 2.92; F, 42.51; N, 6.27.

Preparation of pentafluoroisopropylideneimine

Ammonia, 21 ml. at $-78°$ C. (ca. 1 mole) was slowly distilled into 74.3 g. (0.33 mole) of N-phenylpentafluoro-isopropylideneimine contained in a flask cooled by an ice bath and connected to a Dry Ice-cooled condenser. The reaction mixture was allowed to reflux for 2 hours, and then stirred at room temperature overnight. The entire reaction mixture, ca. 60 ml., was mixed with 200 g. of phosphorus pentoxide contained in a flask connected to a simple still. The flask was heated strongly to distill out the volatile products. The distillate was redistilled to give 26.1 g. (52% yield) of pentafluoroisopropylideneimine as a colorless liquid, B.P. 42.5° C., $n_D^{25}$ <1.3. This imine was also prepared in 38% yield by a pyrolytic distillation at atmospheric pressure of N-phenylpentafluoroisopropyl-ideneimine.

The $F^{19}$ NMR (internal $FCCl_3$ reference) spectrum indicated the presence of two isomers (syn and anti). The major isomer (58%) showed a triplet ($J=4.5$) to a doublet ($J=2.4$) centered at 71.8 p.p.m. (3F) and a doublet ($J=54$ c.p.s.) to quartets ($J=4.5$ c.p.s.) to doublets ($J=4.5$) centered at 127.0 p.p.m. (2F); the minor isomer (42%) showed a triplet ($J=6$) to triplet ($J=1$) at 72.6 p.p.m. and a doublet ($J=53$) to quartets ($J=6$) to doublets ($J=3.4$) centered at 123.4 p.p.m. The $H^1$ NMR spectrum of the mixture of isomers showed a broad absorption at $\tau=1.66$ for NH, with the CH of the major isomer as a triplet ($J=54$) to a doublet ($J=0.5$) centered at $\tau 3.80$ and the CH of the minor isomer as a triplet ($J=53$) to quartets ($J=1.0$) to doublets ($J=1.0$) centered at $\tau 3.69$. The infrared spectrum of the isomeric mixture indicated a C=N at $5.87\mu$, NH at $3.03\mu$, and CH at $3.32\mu$.

*Analysis.*—Calcd. for $C_3H_2F_5N$: C, 24.49; H, 1.37; F, 64.60; N, 9.53. Found: C, 24.80; H, 1.52; F, 64.78; N, 9.42.

EXAMPLE 1

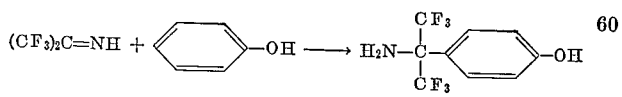

A 21-gram sample (0.125 mole) of hexafluoroisopropylideneimine was added to a 240 ml. Hastelloy-lined autoclave containing 1 g. of aluminum chloride and 21 g. (0.219 mole) of phenol. The mixture was heated at 150° C. for 8 hr., cooled to room temperature and vented. The recovered semisolid (32 g.) was mixed with ether and filtered to remove undissolved salts. The ether solution (ca. 100 ml.) was dried over magnesium sulfate, concentrated under aspirator pressure and distilled. After ether and excess phenol were removed, 15.6 g. (50%) of 4-hydroxy-$\alpha,\alpha$-bis(trifluoromethyl)benzylamine, B.P. 80° C. (1.0 mm.), M.P. 70–73° C., was obtained. The infrared spectrum of this material was consistent with the assigned structure. The ultraviolet spectrum showed $$\lambda_{max.}^{ethanol} \ 478 \ (\epsilon=1030)$$

272 ($\epsilon=1285$), 225 m$\mu$ ($\epsilon=10{,}520$); the $H^1$ NMR showed broad singlets at $\tau=7.1$ (2H; —NH$_2$), and 1.3 (1H; —OH), and a characteristic $A_2B_2$ pattern ($J=9$) centered at $\tau=2.68$ (para-substituted aromatic) and the $F^{19}$ NMR contained a broad singlet at +360 c.p.s. from internal 1,2-difluoro-1,1,2,2-tetrachloroethane at 56.4 mc.

*Analysis.*—Calcd. for $C_9H_7F_6NO$ (259.16): C, 41.70; H, 2.72; N, 5.41; F, 43.99. Found: C, 41.70; H, 2.84; N, 5.43; F, 44.48.

EXAMPLE 2

Example 1 was repeated using 22 g. of imine, 21 g. of phenol and 1 g. of hydrogen fluoride instead of aluminum chloride at 150° C. for 8 hr. to yield 22.6 g. of 4-hydroxy-$\alpha,\alpha$-bis(trifluoromethyl)benzylamine.

EXAMPLE 3

Example 1 was repeated substituting 4 g. of boron trifluoride for aluminum chloride to give about a 40% yield of the same benzylamine.

EXAMPLE 4

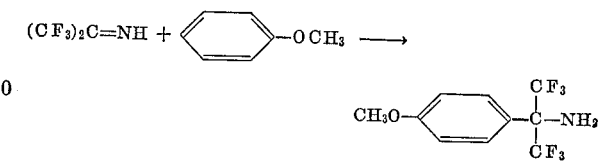

Using the reaction and work-up procedure described in Example 1, 31.5 g. of slightly impure 4-methoxy-$\alpha,\alpha$-bis(trifluoromethyl)benzylamine, B.P. 65° C. (1.2 mm.), was obtained from 40 g. of hexafluoroisopropylideneimine, 22 g. of anisole and 3.36 g. of aluminum chloride at 150° C. for 8 hr. A sample was purified by preparative gas chromatography and exhibited a M.P. of 53–53.5° C. The $H^1$ NMR of the benzylamine contained a sharp singlet at $\tau=6.24$ (—OCH$_3$), a broad peak at $\tau=7.8$ (—NH$_2$) and an $A_2B_2$ pattern centered at $\tau=2.8$ (para-disubstituted aromatic); the $F^{19}$ NMR shows a singlet at +4219 c.p.s. from internal fluorotrichloromethane at 56.4 mc.

*Analysis.*—Calcd. for $C_{10}H_9ONF_6$ (273.18): C, 43.96; H, 3.32; N, 5.13; F, 41.73. Found: C, 43.84; H, 3.53; N, 4.85; F, 41.83.

EXAMPLE 5

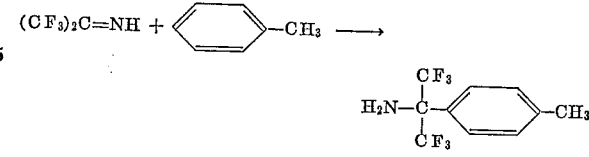

A 17.4 gram sample of 4-methyl-$\alpha,\alpha$-bis(trifluoromethyl)benzylamine (B.P. 125° C./100 mm.) was prepared by heating 25 g. of toluene, 3.12 g. of aluminum chloride and 25 g. of hexafluoroisopropylideneimine at 150° C. for 8 hr. using the reaction and work-up procedure of Example 1. The ultraviolet spectrum of this benzylamine showed maxima at 268 ($\epsilon=114$), 265 ($\epsilon=196$), 259 ($\epsilon=243$), 252 ($\epsilon=199$) and 210 m$\mu$ ($\epsilon=8{,}340$) which is characteristic of a p-disubstituted benzene. The $H^1$ NMR had an $A_2B_2$ pattern at $\tau=2.6$ (aromatic) a singlet at $\tau=7.83$ (CH$_3$) and at $\tau=7.95$ (NH$_2$) and the $F^{19}$ NMR was a singlet at +4202 c.p.s. from internal fluorotrichloromethane at 56.4 mc.

*Analysis.*—Calcd. for $C_{10}H_9NF_6$ (257.18): C, 46.69; H, 3.53; N, 5.45; F, 44.33. Found: C, 46.56; H, 3.61; N, 5.48; F, 44.10.

EXAMPLE 6

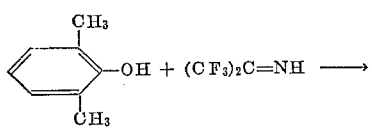

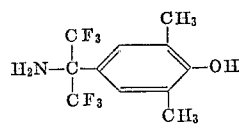

3,5-dimethyl-4-hydroxy - α,α - bis(trifluoromethyl)benzylamine (8 g., M.P. 65–68° C.) was prepared from 25 g. of 2,6-dimethylphenol, 25 g. of hexafluoroisopropylideneimine and 1 g. of hydrogen fluoride at 150° C. for 8 hr. as described in Example 1. The amine was isolated by short path distillation, at 0.3 mm., of a 25 g. sample of the crude reaction mixture (42 g. was the total recovered). The $F^{19}$ NMR showed a singlet at +4228 c.p.s. from int. $FCCl_3$ at 56.4 mc.; and the $H^1$ NMR contained singlets at $\tau$=7.7 ($CH_3$), 2.6 (arom. H) and a very broad peak at $\tau$=7 ($NH_2$; OH).

EXAMPLE 7

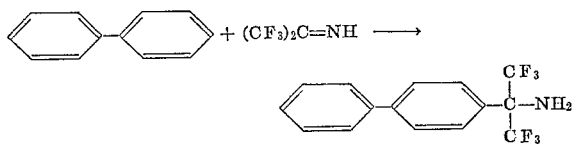

4 - phenyl - α,α-bis(trifluoromethyl)benzylamine, 4 g., B.P. 135° C. (2 mm.), M.P. 93–96° C., was prepared from 33 g. of hexafluoroisopropylideneimine, 3.06 g. of aluminum chloride and 15 g. of biphenyl at 150° C. for 8 hr. as described in Example 1. The amine was isolated by short path distillation of 21 g. sample of the reaction mixture (39 g. was the total recovered). The ultraviolet spectrum showed $\lambda_{max}$ 252 mμ ($\epsilon$=19,000); the $F^{19}$ NMR showed a singlet at +4158 c.p.s. from int. $FCCl_3$ at 56.4 mc. and the $H^1$ NMR exhibited an —$NH_2$ absorption at $\tau$=8.0 and aromatic absorptions at $\tau$=2.5 with the proper ratio.

*Analysis.*—Calcd. for $C_{15}H_{11}F_6N$ (319.25): C, 56.43; H, 3.48; N, 4.34; F, 35.72. Found: C, 55.64; H, 3.48; N, 4.36; F, 36.49.

EXAMPLE 8

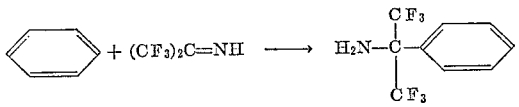

α,α-bis(trifluoromethyl)benzylamine, 4.6 g., B.P. 95° C. (60 mm.) was prepared from 25 g. of benzene, 25 g. of hexafluoroisopropylideneimine and 4.0 g. of aluminum chloride at 200° C. for 8 hr., as per Example 1. The ultraviolet spectrum showed:

$\lambda_{max}$ 266 ($\epsilon$=389), 260 ($\epsilon$=465), 254 ($\epsilon$=406), 250 mμ ($\epsilon$=347)

which is characteristic of a mono-substituted benzene. The $H^1$ NMR showed an —$NH_2$ peak at $\tau$=7.9 and aromatic absorption at $\tau$=2.3 in the proper intensities.

*Analysis.*—Calcd. for $C_9H_7NF_6$ (243.16): C, 44.46; H, 2.90; N, 5.76; F, 46.89. Found: C, 44.75; H, 2.72; N, 5.54; F, 46.54.

EXAMPLE 9

4 - phenyl - α,α-bis(trifluoromethyl)benzylamine, 40 g. crude, was prepared from 40 g. of hexafluoroisopropylideneimine, 15 g. of biphenyl and 3.2 g. of aluminum chloride at 175° C. for 16 hr. as per Example 1. Characterization is given in Example 7.

EXAMPLE 10A

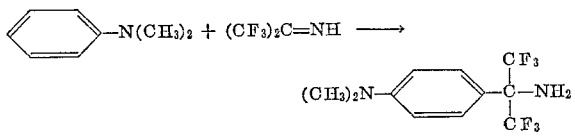

A 34 g. sample of hexafluoroisopropylideneimine was added to 3.22 g. of aluminum chloride and .24 g. of N,N-dimethylaniline at −78° C. in an autoclave and the mixture was heated at 150° C. for 8 hr. as described in Example 1. A black solid, 52 g., was recovered from the autoclave. This material was dissolved in ether and filtered to remove a green solid. The blue filtrate was evaporated to dryness and then taken up in pentane and filtered to remove a blue solid. The yellow filtrate was concentrated and cooled in an ice bath to yield, after filtration, a white solid, 14.7 g., M.P. 58.5–59.5° C. A second crop, 6.5 g., was also recovered. This white solid was 4-N,N-dimethylamino - α,α - bis(trifluoromethyl)benzylamine. The ultraviolet spectrum showed: $\lambda_{max}$. 292 ($\epsilon$=2400), 262 ($\epsilon$=21,000). The $F^{19}$ NMR gave a singlet at +4185 c.p.s. from internal $FCCl_3$ at 56.4 mc. and the $H^1$ NMR showed the characteristic $A_2B_2$ pattern at $\tau$=2.9, —$CH_3$ absorption at $\tau$=7.16 and an —$NH_2$ band at $\tau$=8.05, all with the proper intensities.

*Analysis.*—Calcd. for $C_{11}H_{12}N_2F_6$ (286.22): C, 46.15; H, 4.23; N, 9.81; F, 39.83. Found: C, 46.94; H, 4.50; N, 9.45; F, 40.01.

EXAMPLE 10B

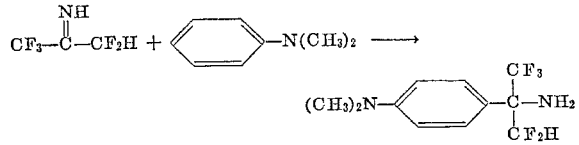

A mixture of 6.06 g. (0.05 mole) of N,N-dimethylaniline, 0.75 g. of aluminum chloride, and 7.35 g. (0.05 mole) of pentafluoroisopropylideneimine was stirred at 25° C. for 20 hours, and then heated at 100° C. for 4 hours. The entire reaction mixture was distilled at reduced pressure. After removal of unchanged imine and aniline, 4 - dimethylamino - α - trifluoromethyl - α-difluoromethylbenzylamine was obtained as a liquid, B.P. 70–80° C. (1 mm.), that solidified to a glass upon cooling. The benzylamine was characterized by its $H^1$ and $F^{19}$ NMR spectra. The $H^1$ spectrum in $(CD_3)_2CO$ showed a singlet (6H) at $\tau$6.86 for $N(CH_3)_2$, a broad absorption (2H) at $\tau$6.40 for $NH_2$, and a triplet (J=54 c.p.s.) centered at $\tau$3.23 (1H) for $CF_2H$ in addition to absorption due to aromatic H. The $F^{19}$ spectrum showed a triplet (J=8.5 c.p.s.) at 74.0 p.p.m. for $CF_3$ and a doublet (J=54 c.p.s.) split further to a quartet (J=8.5 c.p.s.) centered at 130.1 p.p.m. (internal $FCCl_3$ reference) for $CF_2H$.

EXAMPLE 11

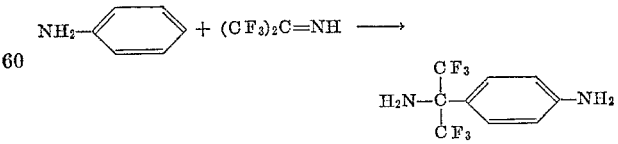

4-amino-α,α-bis(trifluoromethyl)benzylamine, 2.15 g., M.P. 69–70° C., was obtained from 19 g. of aniline, 3 g. of hydrogen fluoride and 33 g. of hexafluoroisopropylideneimine by heating at 150° C. for 8 hours using the reaction procedure of Example 1. The product was isolated by distillation of the recovered liquid (54 g.) and recrystallization (from pentane-ether) of the fraction boiling at 81° C./4.5 mm.–85° C./5 mm. The ultraviolet spectrum, $\lambda_{max}$. 287 ($\epsilon$=1700), 247 mμ ($\epsilon$=13,150), was characteristic of p-substituted anilines. The $H^1$ NMR had the characteristic $A_2B_2$ pattern centered at $\tau$=2.9 and a broad peak at $\tau$=7.1 for the $NH_2$-absorptions and the $F^{19}$ NMR showed a singlet at +4227 c.p.s. from internal FCCl₃ at 56.4 mc.

*Analysis.*—Calcd. for C₉H₈N₂F₆ (258.17): C, 41.88; H, 3.13; N, 10.86; F, 44.00. Found: C, 42.01; H, 2.98; N, 10.17; F, 44.01.

EXAMPLE 12

4 - N,N - dimethylamino - α,α - bis(trifluoromethyl)-benzylamine, 11 g., was prepared as per Example 10A from 24 g. of N,N-dimethylaniline, 33 g. of hexafluoroisopropylideneimine and 3 g. of hydrogen fluoride by heating at 150° C. for 8 hours.

EXAMPLE 13

4-methyl-α,α-bis(trifluoromethyl)benzylamine, 55.6 g., was prepared as per Example 5, from 100 g. of toluene, 3 g. of aluminum chloride and 100 g. of hexafluoroisopropylideneimine by heating at 150° C. for 8 hours except that the reaction mixture recovered from the autoclave was worked up by filtering and then distilling the filtrate.

EXAMPLE 14

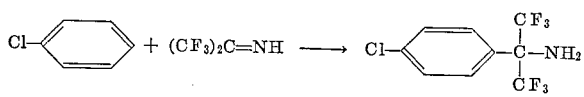

4-chloro - α,α - bis(trifluoromethyl)benzylamine, 0.3 g., B.P. 50° C. (1.25 mm.), was prepared from 22 g. of chlorobenzene, 3 g. of aluminum chloride and 34 g. of hexafluoroisopropylideneimine using the reaction procedure of Example 1. The product was isolated by filtering the reaction mixture (30 g.) and then distilling the filtrate. The H¹ NMR had the characteristic A₂B₂ pattern centered at τ=7.85 and the F¹⁹ NMR showed a singlet at +4204 c.p.s. from int. FCCl₃ at 56.4 mc.

*Analysis.*—Calcd. for C₉H₆NF₆Cl (277.63): C, 39.94; H, 2.18; N, 5.05; F, 41.07; Cl, 12.77. Found: C, 39.40; H, 2.63; N, 4.60; F, 40.16; Cl, 12.97.

EXAMPLE 15

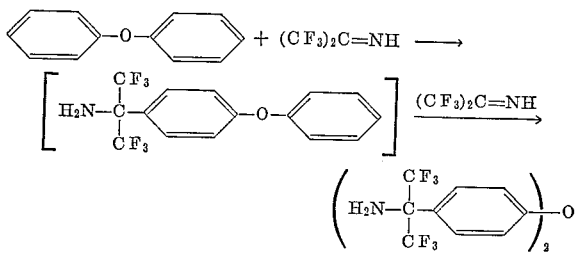

A 17-gram sample of diphenyl ether, 3.2 g. of aluminum chloride and 40 g. of hexafluoroisopropylideneimine were heated at 150° C. for 8 hours as per Example 1. The semisolid recovered from the autoclave (53 g.) was treated with 300 ml. of ether and filtered to remove solids. Evaporation of the ether from the filtrate gave 50 g. of residue, 22 g. of which was distilled through a short column to give 17.2 g. of product, B.P. ca. 149–162° C. (1 mm.). This material was redistilled through a spinning-band column and gave 8.0 g. of 4,4'-oxybis[α,α-bis(trifluoromethyl)-benzylamine], also called 4,4'-bis(2-aminohexafluoroisopropyl)diphenyl ether, B.P. 124° C. (0.2 mm.), M.P. 50–52° C. This benzylamine had the UV spectrum $\lambda_{max.}^{ethanol}$ 276 (ε=1,050), 268 (ε=1,350), 232 mμ (ε=15,050)

the F¹⁹ NMR spectrum (a singlet at +4226 c.p.s. from internal FCCl₃ at 56.4 mc.) required by its structure. Its mass spectrum showed a parent at m./e. 500 which gives its molecular weight and a base peak at m./e. 431 (parent less CF₃). The H¹ NMR showed the expected A₂B₂ pattern centered at τ=2.6 and a NH₂ peak at τ=7.96.

*Analysis.*—Calcd. for C₁₈H₁₂ON₂F₁₂ (500.30): C, 43.21; H, 2.42; N, 5.60. Found: C, 43.46; H, 2.48; N, 5.60.

A lower boiling fraction of the distillation, 1.4 g., B.P. 117–119° C. (0.2 mm.), contained, in addition to the 2:1 adduct described above, a smaller amount of 4-phenoxy-α,α-bis(trifluoromethyl)benzylamine as evidenced by its gas chromatographic retention volume (falling in between diphenyl ether and the 2:1 adduct) and an F¹⁹ NMR signal in the expected position of +4328 c.p.s. from internal FCCl₃ at 56.4 mc. (an unsplit singlet).

EXAMPLE 16

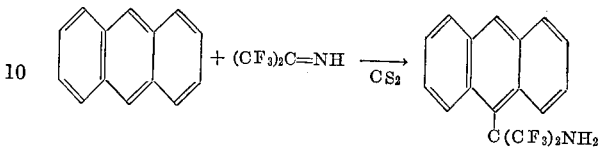

An 18 g. sample of anthracene was heated at 150° C. for 8 hours with 2.8 g. of aluminum chloride, 200 ml. of carbon disulfide and 17 g. of hexafluoroisopropylideneimine. Evaporation of the solvent gave a greenish solid. Vacuum sublimation at 80–120° C. (0.05 mm.) gave 15 g. of 9-(2-aminohexafluoroisopropyl)anthracene, M.P. 210° C. The H¹ NMR (DMSO-d₆)[1] showed a complex aromatic absorption at τ=2.2–3.8 (very much like the aromatic pattern of 9-methylanthracene except spread out more) and an —NH₂ absorption at τ=7.35 in the proper ratio. The F¹⁹ NMR showed a singlet at +4068 c.p.s. from int. FCCl₃. The mass spectrum showed a molecular weight of 343 and the expected cracking pattern.

*Analysis.*—Calcd. for C₁₇H₁₁F₆N (343.27): C, 59.47; H, 3.23; F, 33.21; N, 4.08. Found: C, 59.97; H, 3.35; F, 32.60; N, 4.02.

EXAMPLE 17

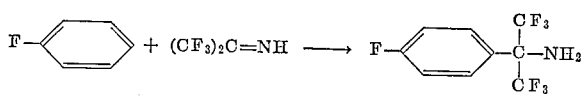

A 50 g. sample of fluorobenzene, 11 g. of aluminum chloride and 150 g. of hexafluoroisopropylideneimine were heated together at 250° C. for 8 hours. Filtration of the reaction mixture gave a solid which was mixed with 50 ml. of saturated sodium bicarbonate solution and extracted with ether (500 ml.) (brine and water were used to break emulsions). The ether extract was washed with sodium bicarbonate solution and with water and dried over magnesium sulfate. Concentration and distillation (spinning-band) gave 13.8 g. of 4-fluoro-α,α-bis(trifluoromethyl)benzylamine, B.P. 69° C. (10 mm.). The H¹ NMR showed a characteristic A₂B₂ pattern with halves centered at τ2.12 and 2.83 (each split further) and an —NH₂ band at τ7.80. The ultraviolet was characteristic of a para-disubstituted benzene $\lambda_{max.}^{ethanol}$ 266 (ε=271), 259 (ε=289), 257.5 (ε=292), 255 (ε=251), 252.5 mμ (ε=248)

*Analysis.*—Calcd. for C₉H₆NF₇ (261.15): C, 41.39; H, 2.32; N, 5.37; F, 50.93. Found: C, 41.98; H, 2.44; N, 5.48; F, 51.07.

EXAMPLE 18

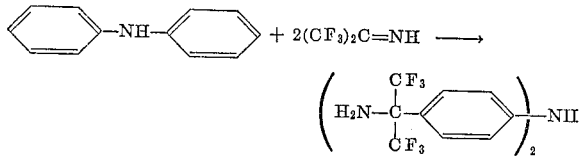

A 36 g. sample of diphenylamine, 2.5 g. of aluminum chloride and 36 g. of hexafluoroisopropylideneimine were heated together at 100° C. for 8 hours. The dark solid (64 g.) thus obtained was mixed with 5 g. of solid sodium bicarbonate and distilled through a short column. The fraction boiling at about 175° C. (0.75 mm.), 24 g., was washed with pentane and yielded 18.6 g. of white crystals (M.P. 83–85° C.) of 4,4'-bis(2-aminohexafluoroisopropyl)diphenylamine. The F¹⁹ NMR showed a singlet at +4233 c.p.s. (internal FCCl₃) and the H¹ NMR showed a characteristic A₂B₂ pattern (J=8.5) with halves ---
[1] Dimethylsulfoxide-d₆.

at τ2.4 and 3.0, an —NH absorption at τ4.2 and —NH₂ band at τ8.0.

*Analysis.*—Calcd. for C₁₈H₁₃F₁₂N₃ (499.30): C, 43.30; H, 2.62; N, 8.42; F, 45.7. Found: C, 43.00; H, 2.60; N, 8.68; F, 44.88.

EXAMPLE 19

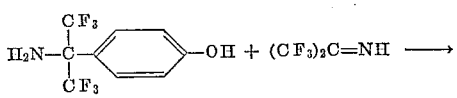

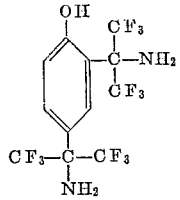

A 26 g. sample of 4-hydroxy-α,α-bis(trifluoromethyl)-benzylamine, 2.2 g. of aluminum chloride and 20 g. of hexafluoroisopropylideneimine were heated at 200° C. for 8 hours. The recovered solid (42 g.) was combined with 50 ml. of ether and 50 ml. of pentane and filtered. The filtrate was dried over magnesium sulfate and the solvents were removed. The residue (30 g.) was vacuum sublimed at 67° C. (0.05 mm.) –110° C. (0.03 mm.); a total of 16.7 g. (36%) of 2,4-bis(2-aminohexafluoroisopropyl)phenol was obtained. A center fraction, collected at 70° C. (0.05 mm.) had a M.P. of 82–84° C. The H¹ NMR spectrum (CDCl₃) showed aromatic absorption at τ2.0–3.3 and a broad peak centered at τ8 and the F¹⁹ NMR exhibited two singlets at +4196 and 4233 c.p.s. (int. FCCl₃; some very minor impurities present).

*Analysis.*—Calcd. for C₁₂H₈F₁₂N₂O (424.21): C, 33.97; H, 1.90; N, 6.61; F, 53.8. Found: C, 34.15; H, 2.21; N, 6.33; F, 53.41.

EXAMPLE 20

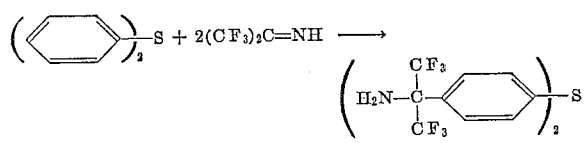

An 18 g. sample of diphenyl sulfide, 3 g. of aluminum chloride and 34 g. of hexafluoroisopropylideneimine were heated at 150° C. for 8 hours. The recovered product (39 g.) was combined with 5 g. of solid sodium bicarbonate and distilled through a short column. The fraction boiling at 173°–176° C. (0.3 mm.), 19.4 g., was 4,4'-bis(2-aminohexafluoroisopropyl)diphenyl sulfide. The H¹ NMR showed the characteristic A₂B₂ pattern and an —NH₂ absorption. The F¹⁹ NMR was a singlet at +4207 c.p.s. (int. FCCl₃).

*Analysis.*—Calcd. for C₁₈H₁₂F₁₂SN₂ (516.37) C, 41.87; H, 2.35; N, 5.43; F, 44.2. Found: C, 42.08; H, 2.58; N, 5.66; F, 44.27.

EXAMPLE 21

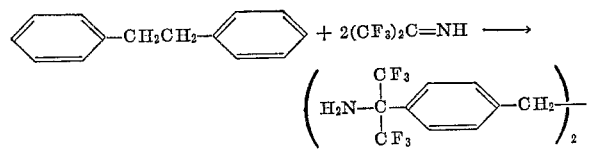

A 34 g. sample of hexafluoroisopropylideneimine was added to 3 g. of aluminum chloride and 18 g. of bibenzyl as per Example 1 (150° C. for 8 hr.). The recovered product was combined with 5 g. of solid sodium bicarbonate and distilled through a spinning-band column. The product, 4,4'-bis(2-aminohexafluoroisopropyl)bibenzyl, 8.6 g. (16%), B.P. 145–146° C. (1–2 mm.), was collected. A pentane-washed sample melted at 116–117° C. The H¹ NMR showed the characteristic A₂B₂ pattern centered at 2.31 and 2.79 for aromatic protons, a sharp singlet at 7.04 (—CH₂CH₂—) and a broad singlet at 7.86 (2NH₂). The F¹⁹ NMR showed a singlet at +4217 c.p.s. from int. FCCl₃. The mass spectrum showed a molecular weight of 512 and the required fragmentation.

*Analysis.*—Calcd. for C₂₀H₁₆N₂F₁₂ (512.35): C, 46.88; H, 3.15; N, 5.47; F, 44.50. Found: C, 47.14; H, 3.26; N, 5.42; F, 44.68.

EXAMPLE 22

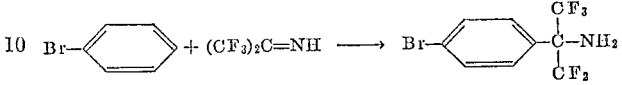

A 34 g. sample of hexafluoroisopropylideneimine was added to a mixture of 6 g. of aluminum chloride and 45 g. of bromobenzene in an autoclave. The autoclave was heated at 275° C. for 8 hr. The recovered material was filtered through a sintered-glass funnel and the solid thus obtained was mixed with 50 ml. of saturated sodium bicarbonate solution and extracted with ether. The ether extracts were washed with sodium bicarbonate solution, then with water, and dried over magnesium sulfate. Removal of the ether followed by distillation afforded 0.7 g. of 4-bromo-α,α-bis(trifluoromethyl)benzylamine, B.P. 122° C. (10 mm.), M.P. 35–36° C. The F¹⁹ NMR showed a singlet at +4212 c.p.s. from int. FCCl₃. The H¹ NMR shows aromatic absorption at τ2.4 and an —NH₂ peak at τ7.83. The mass spectrum showed a molecular weight of 322 and the required fragmentation.

*Analysis.*—Calcd. for C₉H₆BrF₆N (322.07): C, 33.56; H, 1.88; N, 4.35; F, 35.38; Br, 24.81. Found: C, 34.11; H, 2.08; N, 4.03; F, 34.44; Br, 23.79.

EXAMPLE 23

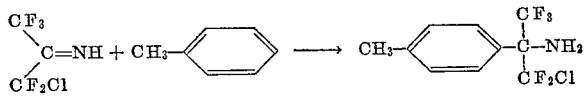

A 4.8 g. sample of 4-methyl-α-trifluoromethyl-α-chlorodifluoromethylbenzylamine, B.P. 79° C. (0.75 mm.), was prepared from 30 g. of toluene, 18 g. of chloropentafluoroisopropylideneimine and 3 g. of aluminum chloride by heating at 150° C. for 8 hr. as per Example 1. The reaction mixture recovered from the autoclave (46 g.) was filtered and the filtrate was distilled to isolate the product. This benzylamine had a characteristic A₂B₂ pattern at τ=2.6, —CH₃ absorption at τ=7.71 and an —NH₂ peak at τ=7.9 in the H¹ NMR. The F¹⁹ NMR had an A₃B₂ (J=12) pattern at +4076 (CF₃) and +3372 c.p.s. (—CF₂Cl) from int. FCCl₃ at 56.4 mc.

*Analysis.*—Calcd. for C₁₀H₉F₅NCl (273.64): C, 43.88; H, 3.32; N, 5.13; F, 34.72; Cl, 12.96. Found: C, 44.60; H, 3.48; N, 4.97; F, 34.17; Cl, 12.91.

EXAMPLE 24

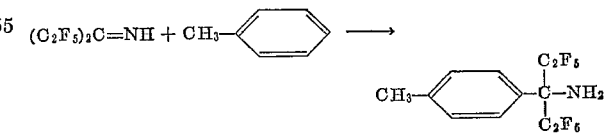

A 3 g. sample of aluminum chloride was added at −78° C. to a solution of 6.4 g. of decafluoro-3-pentylideneimine in 25 g. of toluene and the mixture was heated to 175° C. for 8 hr. The recovered product was combined with ca. 150 ml. of ether and the resulting mixture washed with sodium bicarbonate solution. The bicarbonate washings were back-extracted with additional ether. The combined ether layers were washed with water, dried over magnesium sulfate and concentrated to 25 ml. under reduced pressure, and then distilled through a spinning-band column. The fraction boiling at ca. 30° C. (0.5 mm.), weighing 0.7 g. (8%), was 4-methyl-α,α-bis(pentafluoroethyl)benzylamine. The F¹⁹ NMR showed singlets at +4370 (2CF₃) and +6601 c.p.s. (2CF₂) from int. FCCl₃. The H¹ NMR showed an A₂B₂ pattern at τ2.4 and 2.85, —CH₃ absorption at 7.63 and an —NH₂ peak at 7.85.

*Analysis.*—Calcd. for $C_{12}H_9NF_{10}$ (357.20): C, 40.35; H, 2.54; N, 3.92; F, 53.19. Found: C, 41.14; H, 2.83; N, 3.76; F, 53.44.

The products of Examples 25 through 45, Table I, were prepared following the procedure of Example 1, employing the reactants shown in the left and center columns in place of the corresponding reactants of Example 1.

Table II summarizes Examples 46 through 49, carried out in the manner of Example 1 but using the reactants and catalysts listed in place of the corresponding reactants and catalysts of Example 1.

TABLE I

| Example No. | Polyfluoroalkylideneimine | HQH compound | Product |
|---|---|---|---|
| 25 | $C_4F_9\overset{NH}{\overset{\|}{C}}-C_5F_{11}$ | $(CH_3)_2-CH-\mathrm{C_6H_5}$ | $(CH_3)_2-CH-C_6H_4-C(C_4F_9)(C_5F_{11})-NH_2$ |
| 26 | $HCF_2-\overset{NH}{\overset{\|}{C}}-CF_3$ | $HO-\mathrm{C_6H_5}$ | $HO-C_6H_4-C(CF_3)(CF_2H)-NH_2$ |
| 27 | $HCF_2-\overset{NH}{\overset{\|}{C}}-CF_3$ | $C_6H_5-O-C_6H_5$ | $C_6H_5-O-C_6H_4-C(CF_2H)(CF_3)-NH_2$ |
| 28 | $CF_3-\overset{NH}{\overset{\|}{C}}-CF_3$ | $(CH_3)_2N-C_6H_4-C(CF_2Cl)(CF_3)-NH_2$ | $(H_3C)_2N-C_6H_3[C(CF_2Cl)(CF_3)NH_2][C(CF_3)_2NH_2]$ |
| 29 | $C_2F_5-\overset{NH}{\overset{\|}{C}}-CF_3$ | $Cl-C_6H_4-O-C_6H_5$ | $Cl-C_6H_4-O-C_6H_4-C(C_2F_5)(CF_3)-NH_2$ |
| 30 | $CF_3-\overset{NH}{\overset{\|}{C}}-CF_3$ | $C_5H_{11}O-C_6H_5$ | $C_5H_{11}O-C_6H_4-C(CF_3)_2-NH_2$ |
| 31 | $HCF_2-\overset{NH}{\overset{\|}{C}}-CF_2CF_3$ | 2-naphthol | 1-[C(CF_2H)(CF_2CF_3)NH_2]-2-naphthol |
| 32 | $CF_3-\overset{NH}{\overset{\|}{C}}-(CF_2)_5CF_3$ | anthracene | anthracene-$C(CF_3)[(CF_2)_5CF_3]NH_2$ |
| 33 | $CF_3-\overset{NH}{\overset{\|}{C}}-CF_3$ | $(n-C_4H_9)_2N-C_6H_5$ | $(n-C_4H_9)_2N-C_6H_4-C(CF_3)_2-NH_2$ |
| 34 | $C_2F_5-\overset{NH}{\overset{\|}{C}}-CF_2Cl$ | $n-C_5H_{11}-C_6H_5$ | $n-C_5H_{11}-C_6H_4-C(C_2F_5)(CF_2Cl)-NH_2$ |
| 35 | $CF_3-\overset{NH}{\overset{\|}{C}}-C_3$ | cyclopentyl-$C_6H_5$ | [-(CH_2)_4CH-]-C_6H_4-C(CF_3)_2-NH_2 |
| 36 | $CF_3-\overset{NH}{\overset{\|}{C}}-CF_3$ | $H_3C-S-C_6H_5$ | $H_3C-S-C_6H_4-C(CF_3)_2-NH_2$ |
| 37 | $CF_3-\overset{NH}{\overset{\|}{C}}-CF_3$ | $O_2N-C_6H_4-N(C_6H_{13})-C_6H_5$ | $O_2N-C_6H_4-N(C_6H_{13})-C_6H_4-C(CF_3)_2-NH_2$ |

TABLE I—Continued

| Example No. | Polyfluoroalkylideneimine | HQH compound | Product |
|---|---|---|---|
| 38 | CF$_3$–C(=NH)–CF$_3$ | 2-methoxy-4-bromo-6-methylphenol (H$_3$CO–, CH$_3$, OH, Br on benzene) | H$_3$CO–C$_6$H(CH$_3$)(OH)(Br)–C(CF$_3$)$_2$NH$_2$ |
| 39 | CF$_3$–C(=NH)–CF$_3$ | HO–C$_6$H$_2$(Cl)(CH$_3$)– | HO–C$_6$H(Cl)(CH$_3$)–C(CF$_3$)$_2$NH$_2$ |
| 40 | ClCF$_2$–C(=NH)–CF$_2$Cl | (H$_3$C)$_2$N–C$_6$H$_3$(CH$_3$)– | (H$_3$C)$_2$N–C$_6$H$_2$(CH$_3$)–C(CF$_2$Cl)$_2$NH$_2$ |
| 41 | ClCF$_2$–C(=NH)–CF$_2$Cl | cyclohexyl-phenyl (CH$_2$)$_5$CH–C$_6$H$_5$ | (CH$_2$)$_5$CH–C$_6$H$_4$–C(CF$_2$Cl)$_2$NH$_2$ |
| 42 | CF$_3$–C(=NH)–CF$_3$ | HO–C$_6$H$_4$–(CF$_2$)$_3$–CF$_3$ | HO–C$_6$H$_3$[(CF$_2$)$_3$CF$_3$]–C(CF$_3$)$_2$NH$_2$ |
| 43 | CF$_3$–C(=NH)–CF$_3$ | CH$_3$CH$_2$NH–C$_6$H$_3$(F)(F)– | CH$_3$CH$_2$NH–C$_6$H$_2$(F)(F)–C(CF$_3$)$_2$NH$_2$ |
| 44 | CF$_3$–C(=NH)–CF$_3$ | 2,3,5,6-tetramethylphenyl (C$_6$H(CH$_3$)$_4$) | (CH$_3$)$_4$C$_6$H–C(CF$_3$)$_2$NH$_2$ |
| 45 | C$_3$F$_7$–C(=NH)–C$_3$F$_7$ | O$_2$N–C$_6$H$_4$–(CH$_2$)$_6$–C$_6$H$_5$ | O$_2$N–C$_6$H$_4$–(CH$_2$)$_6$–C$_6$H$_4$–C(C$_3$F$_7$)$_2$NH$_2$ |

TABLE II

| Example No. | Polyfluoroimine | HQH compound | Catalyst | Product |
|---|---|---|---|---|
| 46 | CF$_3$–C(=NH)–CF$_3$ | HO–C$_6$H$_5$ | FeCl$_3$ | HO–C$_6$H$_4$–C(CF$_3$)$_2$NH$_2$ |
| 47 | CF$_3$–C(=NH)–CF$_3$ | (CH$_3$)$_2$N–C$_6$H$_5$ | SnCl$_4$ | (CH$_3$)$_2$N–C$_6$H$_4$–C(CF$_3$)$_2$NH$_2$ |
| 48 | CF$_3$–C(=NH)–CF$_3$ | HO–C$_6$H$_5$ | HF/BF$_3$ | HO–C$_6$H$_4$–C(CF$_3$)$_2$NH$_2$ |
| 49 | CF$_3$–C(=NH)–CF$_3$ | (CH$_3$)$_2$N–C$_6$H$_5$ | ZnCl$_2$ | (CH$_3$)$_2$N–C$_6$H$_4$–C(CF$_3$)$_2$NH$_2$ |

The novel fluorinated benzylamines of this invention are useful as plasticizers, heat-transfer media which are stable in the presence of metal, and as monomers for the formation of polymers, for example, polyamides. The following examples illustrate the utility of the products of this invention.

EXAMPLE 50

Samples of polymethyl methacrylate were placed in three test tubes labeled A to C. To tube A was added enough hot chloroform to dissolve the polymer. To tube B was added an equal part (estimated by volume) of 4-hydroxy-α,α-bis(trifluoromethyl)benzylamine, prepared as in Example 1, followed by enough hot chloroform to dissolve the one-to-one mixture. To tube C was added one-half part of α,α-bis(trifluoromethyl)benzylamine, prepared as in Example 8, followed by enough hot chloroform to dissolve the mixture. The chloroform solutions were poured onto glass plates and allowed to stand at room temperature for about one hour. Samples were scraped from the plates and compression molded at 130–140° C. and 400 p.s.i. Sample A gave a brittle, bubbly product. Samples B and C, however, gave colorless, pliable films which could be creased without cracking, unlike the brittle films pressed from untreated polymer. This experiment illustrates the usefulness of the compounds of this invention as plasticizers.

EXAMPLE 51

A sample of 4-methyl-α,α-bis(trifluoromethyl)benzylamine, prepared as in Example 6, was dissolved in ether; the solution was washed with 5% aqueous sodium bicarbonate, then with water, and dried over anhydrous magnesium sulfate. The ether solution was concentrated and distilled. Samples of the benzylamine thus obtained were sealed under vacuum in glass tubes with and without pieces of metal, as specified below. Gas chromatography analysis showed no visible decomposition of the benzylamine when heated at 200° C. for 24 hours alone or in the presence of aluminum, copper, or soft iron. This experiment illustrates the usefulness of the compounds of this invention as heat transfer media which are stable when in contact with metal.

EXAMPLE 52

A 1.0 g. sample of 54% sodium hydride suspended in mineral oil was washed three times with benzene (to remove the mineral oil) and suspended in 60 ml. of anhydrous ethylene glycol dimethyl ether (glyme). A 10 g. sample of 4,4'- oxy - bis[α,α-bis(trifluoromethyl) benzylamine], prepared as in Example 15, dissolved in 10 ml. of glyme was added dropwise at room temperature. After stirring at room temperature for 18 hours to form the sodium salt, 3.7 g. of freshly distilled adipoyl chloride was added dropwise at 0–10° C. with stirring. The gray reaction mixture was refluxed and stirred for 22 hours and then 300 ml. of water was added at 0° C.–room temperature. The resulting mixture was extracted with ether and the ether extracts were washed with saturated sodium bicarbonate solution, then with water until neutral, and dried over anhydrous magnesium sulfate. After filtration the ether was evaporated and the residue (7 g.) was dried at 60° C. (1 mm.) The solid gave a viscous melt when molten and exhibited the infrared spectrum expected for the polymer.

*Analysis.*—Calcd. for $(C_{24}H_{18}N_2O_3F_{12})_n$; $(600.30)_n$: N, 4.58; F, 37.4. Found: N, 4.59; F, 38.6.

The reaction by which polymer is formed is summarized in the equations which follow:

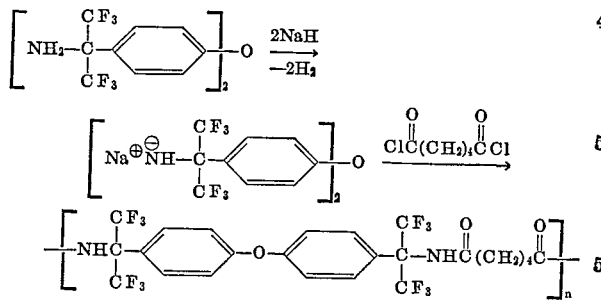

A piece of aluminum foil was melt-coated at 4000 p.s.i. with the above polymer. The coated area was unaffected by concentrated hydrochloric acid while uncoated aluminum foil reacted readily with the acid and was eaten away. This example demonstrates the usefulness of the amines of this invention in the formation of polymers, and more particularly, the utility of the diamines of this invention as monomers for the formation of polyamides. Moreover, this experiment establishes, but does not limit, the utility of the polyamides thus formed.

The embodiments of the invention in which an exclusive property or privilege is claimed are defined as follows:

1. A benzylamine having the formula

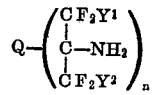

wherein:
$Y^1$ is fluorine, chlorine or 1–6 carbon perfluoroalkyl, ω-chloroperfluoroalkyl or ω-hydroperfluoroalkyl;
$Y^2$ is hydrogen, fluorine, chlorine or 1–6 carbon perfluoroalkyl, ω-chloroperfluoroalkyl or ω-hydroperfluoroalkyl, with the proviso that when $Y^2$ is hydrogen, $Y^1$ is fluorine or 1–6 carbon perfluoroalkyl;
$n$ is an integer from 1–2; and
Q is a radical formed by removal of $n$ hydrogen atoms from an aromatic compound HQH which contains at least one aromatic ring capable of entering into Friedel-Crafts condensation reactions with alkyl halides in the presence of aluminum chloride;
said aromatic compound HQH being selected from the group consisting of monocyclic, polycyclic, and fused polycyclic compounds containing 1–3 six-membered carbocyclic aromatic rings, and polycyclic compounds containing 2 six-membered carbocyclic aromatic rings joined through a bridge selected from the group consisting of —O—, —S—,

and $\text{-(CH}_2\text{)}_m\text{-}$, R being hydrogen, phenyl or alkyl of 1–6 carbon atoms and m being an integer from 1–6; with the proviso that each acid carbocyclic aromatic ring contains 0–4 substituents selected from the group consisting of alkyl, perfluoroalkyl, hydroxy, alkoxy, phenoxy, alkylthio, amino, monoalkylamino, dialkylamino, cyclopentyl, cyclohexyl, halo and nitro, with each of said alkyl and alkoxy moieties containing 1–6 carbon atoms.

2. The process for the preparation of a benzylamine of claim 1 which comprises reacting an aromatic compound HQH as defined in claim 1 with a polyhaloalkylideneimine having the formula

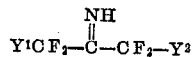

$Y^1$ and $Y^2$ being as defined in claim 1, under autogenous pressure, in the presence of at least 0.005 weight percent, based on the weight of said imine, of a Friedel-Crafts catalyst and in the temperature range of 0° to 300° C., the molar ratio of said imine to HQH compound being in the range of 0.25:1 to 5:1.

3. 4,4'-oxybis[α,α-bis(trifluoromethyl benzylamine].
4. 4,4'-bis(2-aminohexafluoroisopropyl)bibenzyl.
5. 4,4'-bis(2-aminohexafluoroisopropyl)diphenylamine.
6. 4-hydroxy-α,α-bis(trifluoromethyl)benzylamine.
7. 4-methyl-α,α-bis(trifluoromethyl)benzylanime.

References Cited

UNITED STATES PATENTS 3,356,725  12/1967  McBee _____ 260—563

ROBERT V. HINES, *Primary Examiner.*

U.S. Cl. X.R.

117—161; 260—566, 570.5, 577, 32.6, 47, 48, 593, 623, 576

PO-1050
(5/69)

UNITED STATES PATENT OFFICE
CERTIFICATE OF CORRECTION

Patent No. 3,446,845      Dated May 27, 1969

Inventor(s) David M. Gale

It is certified that error appears in the above-identified patent and that said Letters Patent are hereby corrected as shown below:

Col. 1, line 39 "$R^1$" should be -- $Y^1$ --;
Col. 2, line 55, "convention" should be -- conventional --;
Col. 3, line 57, "the" should be -- The --;
Col. 4, the first formula in the equation numbered "2.", line 60, "$NC_6H_5$" should be -- $NC_6H_5$ --;

Col. 5, line 35, "13" should be -- 1.3 --;
Col. 7, line 65, "$\tau = 2.3$" should be -- $\tau = 2\text{-}3$ --;
Col. 8, line 9, ".24" should be -- 24 --;
Col. 10, line 75, the footnote, "$-d_5.$" should be -- $-d_6.$ --;
Col. 13, Table I, formula numbered 35, $$CF_3 - \overset{\overset{NH}{\|}}{C} - C_3 \quad \text{should be} \quad CF_3 - \overset{\overset{NH}{\|}}{C} - CF_3 \quad --;$$

Col. 17, line 41, "(600.30)" should be -- (610.30) --;
Col. 18, line 32, Claim 1, "acid" should be -- said --; and
Col. 18, line 52, Claim 3, insert a parenthesis between "(trifluoromethyl" and "benzylamine]."

SIGNED AND
SEALED
MAY 5 1970

(SEAL)
Attest:

Edward M. Fletcher, Jr.
Attesting Officer

WILLIAM E. SCHUYLER, JR.
Commissioner of Patents